US012165647B2

(12) United States Patent
Li

(10) Patent No.: US 12,165,647 B2
(45) Date of Patent: Dec. 10, 2024

(54) PHONEME-BASED TEXT TRANSCRIPTION SEARCHING

(71) Applicant: Microsoft Technology Licensing, LLC, Redmond, WA (US)

(72) Inventor: Yuchen Li, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 270 days.

(21) Appl. No.: 17/804,508

(22) Filed: May 27, 2022

(65) Prior Publication Data
US 2023/0386472 A1    Nov. 30, 2023

(51) Int. Cl.
*G10L 15/26* (2006.01)
*G06F 40/284* (2020.01)
(Continued)

(52) U.S. Cl.
CPC ............ *G10L 15/26* (2013.01); *G06F 40/284* (2020.01); *G10L 15/02* (2013.01); *G10L 15/187* (2013.01); *G10L 2015/025* (2013.01)

(58) Field of Classification Search
CPC ....... G10L 15/26; G10L 15/02; G10L 15/187; G10L 2015/025; G06F 40/284; G06F 16/3343
See application file for complete search history.

(56) References Cited

U.S. PATENT DOCUMENTS 5,970,453 A * 10/1999 Sharman ................. G10L 13/07
704/260
8,593,501 B1   11/2013 Kjeldaas
(Continued)

FOREIGN PATENT DOCUMENTS

WO    2019096056 A1    5/2019
WO    2020224121 A1   11/2020

OTHER PUBLICATIONS

"International Search Report and Written Opinion Issued in PCT Application No. PCT/US23/018762", Mailed Date: Jul. 13, 2023, 13 Pages.
(Continued)

*Primary Examiner* — Douglas Godbold
(74) *Attorney, Agent, or Firm* — Alleman Hall & Tuttle LLP

(57) ABSTRACT

A computer-implemented method is disclosed. A search query of a text transcription is received. The search query includes a word or words having a specified spelling. A sequence of search phonemes corresponding to the specified spelling is generated. A sequence of transcript phonemes corresponding to the text transcription is generated from the text transcription. A search alignment in which the sequence of search phonemes is aligned to a transcript phoneme fragment is generated. Based at least on the search alignment having a quality score exceeding a quality score threshold, the transcript phoneme fragment and an associated portion of the text transcription is determined to result from an utterance of the specified spelling in an audio session corresponding to the text transcription. A search result indicating that the transcript phoneme fragment and the associated portion of the text transcription is determined to have resulted from the utterance is output.

18 Claims, 9 Drawing Sheets

(51) Int. Cl.
*G10L 15/02* (2006.01)
*G10L 15/187* (2013.01)

(56) References Cited

U.S. PATENT DOCUMENTS

| | | | | |
|---|---|---|---|---|
| 9,971,758 | B1* | 5/2018 | Cherepanov | G10L 15/32 |
| 11,443,734 | B2* | 9/2022 | Finlay | G10L 15/08 |
| 11,488,581 | B1* | 11/2022 | Chovel | G10L 15/187 |
| 11,922,931 | B2* | 3/2024 | Mishra | G10L 15/187 |
| 2003/0061043 | A1* | 3/2003 | Gschwendtner | G10L 15/08 |
| | | | | 704/254 |
| 2006/0173680 | A1* | 8/2006 | Verhasselt | G10L 15/22 |
| | | | | 704/E15.04 |
| 2009/0043581 | A1* | 2/2009 | Abbott | G10L 15/187 |
| | | | | 704/254 |
| 2010/0324900 | A1* | 12/2010 | Faifkov | G10L 15/12 |
| | | | | 704/E15.005 |
| 2015/0032448 | A1* | 1/2015 | Wasserblat | G06F 16/60 |
| | | | | 704/235 |
| 2015/0081294 | A1 | 3/2015 | Hsu et al. | |
| 2016/0275945 | A1* | 9/2016 | Elisha | G06F 16/638 |
| 2017/0092262 | A1* | 3/2017 | Pinhasi | G10L 15/02 |
| 2017/0263248 | A1* | 9/2017 | Gruber | G06F 40/166 |
| 2019/0279623 | A1* | 9/2019 | Liu | G10L 15/22 |
| 2020/0403818 | A1* | 12/2020 | Daredia | G10L 17/00 |
| 2021/0065679 | A1* | 3/2021 | Finlay | G10L 15/02 |
| 2021/0082437 | A1* | 3/2021 | Thomas | G10L 15/32 |
| 2021/0225392 | A1* | 7/2021 | Gharpure | G06F 3/0483 |
| 2022/0139373 | A1* | 5/2022 | Weisz | G10L 15/02 |
| | | | | 704/231 |
| 2022/0366892 | A1* | 11/2022 | Finlay | G06F 16/685 |

OTHER PUBLICATIONS

Hahn, et al., "Comparison of Grapheme-to-Phoneme Methods on Large Pronunciation Dictionaries and LVCSR Tasks", In Proceedings of Thirteenth Annual Conference of the International Speech Communication Association, Sep. 9, 2012, pp. 2538-2541.

Mekhaldi, et al., "A Multimodal Alignment Framework for Spoken Documents", In Journal of Multimedia Tools and Applications, vol. 61, Issue 2, Jul. 13, 2011, 36 Pages.

Pitsikalis, et al., "Advances in Phonetics-based Sub-Unit Modeling for Transcription Alignment and Sign Language Recognition", In Proceedings of CVPR Workshops, Jun. 20, 2011, 6 pages.

Stahlberg, et al., "Word Segmentation and Pronunciation Extraction from Phoneme Sequences through Cross-Lingual Word-to-Phoneme Alignment", In Journal of Computer Speech & Language, vol. 35, Jan. 1, 2016, pp. 234-261.

Wang, et al., "Letter-to-Sound Pronunciation Prediction Using Conditional Random Fields", In Journal of IEEE Signal Processing Letters, vol. 18, Issue 2, Feb. 2011, pp. 122-125.

* cited by examiner

| "HI" | "SO" | "HIM" | "AND" | "CLAIRE" | "." |

| "HI" | "KRISTINA" | "," | "CAN" | "YOU" | "HEAR" | "ME" | "?" |

| "I" | "CAN" | "HEAR" | "YOU" | "SO" | "HIM" | "." |

| "I" | "CAN" | " ' " | "T" | "HEAR" | "." | "LET" | " ' " | "S" | "TRY" | "FOR" | "1" | "PM" | "." |

FIG. 5

| "HI" | "SO" | "HIM" | "AND" | "CLAIRE" | "." |

| "HI" | "KRISTINA" | "," | "CAN" | "YOU" | "HEAR" | "ME" | "?" |

| "I" | "CAN" | "HEAR" | "YOU" | "SO" | "HIM" | "." |

| "I" | "CAN" | " ' " | "T" | "HEAR" | "." | "LET" | " ' " | "S" | "TRY" | "FOR" | "ONE" | "PM" | "." |

| "HI" | "SO" | "HIM" | "AND" | "CLAIRE" |

| "HI" | "KRISTINA" | "CAN" | "YOU" | "HEAR" | "ME" |

| "I" | "CAN" | "HEAR" | "YOU" | "SO" | "HIM" |

| "I" | "CAN" | "T" | "HEAR" | "LET" | "S" | "TRY" | "FOR" | "ONE" | "PM"

| "HI" | "SO" | "HIM" | "AND" | "CLAIRE" |

HH-AY1-S-OW1-HH-IY1-MM-AH0-N-D-C-L-AA1-IY1-R-E

| "HI" | "KRISTINA" | "CAN" | "YOU" | "HEAR" | "ME" |

HH-AY1-K-R-IH0-S-T-IT1-N-AH0-C-AH0-N-Y-UW1-HH-IY1-R-M-IY1

| "I" | "CAN" | "HEAR" | "YOU" | "SO" | "HIM" |

AY1-C-AH0-N-HH-IY1-R-Y-UW1-S-OW1-HH-Y1-MM

| "I" | "CAN" | "T" | "HEAR" | "LET" | "S" | "TRY" | "FOR" | "ONE" | "PM"

PHONEME-BASED TEXT TRANSCRIPTION SEARCHING

BACKGROUND

An audio session can be detected and/or recorded for processing by a computer to convert speech uttered by one or more speakers during the audio session into a text transcription. Such a computer-generated text transcription provides diverse benefits relative to a manual approach in which a human subject listens to an audio session and converts speech in the audio session to a text transcription. As one example, a computer processes the audio session and generate the text transcription much faster than a human subject and with higher accuracy relative to the processing time. For example, a human subject has to listen to a recording of an audio session multiple times in order to accurately transcribe the speech to text. Otherwise, the human subject produces a text transcription that includes numerous errors. In contrast, in some examples, a computer produces the text transcription in real-time during the audio session.

Additionally, a computer-generated text transcription provides other benefits. In some examples, a computer identifies and distinguishes different speakers in an audio session and attribute different speech snippets in the text transcription to the different speakers. In some examples, a computer timestamps different speech snippets in the text transcription and link the timestamps to a recording of the audio session, such that a timestamp can be selected in the text transcription to playback a corresponding speech snippet in a recording of the audio session. Such features reduce time and effort to review and examine speech uttered during an audio session.

SUMMARY

A computer-implemented method is disclosed for determining whether a word or words having a specified spelling were uttered during an audio session that was computer-processed to produce a text transcription. A search query of the text transcription is received. The search query includes the word or words having the specified spelling. A sequence of search phonemes corresponding to the specified spelling is generated. A sequence of transcript phonemes corresponding to the text transcription is generated from the text transcription. A search alignment in which the sequence of search phonemes is aligned to a transcript phoneme fragment is generated. Based at least on the search alignment having a quality score exceeding a quality score threshold, the transcript phoneme fragment and an associated portion of the text transcription is determined to have resulted from an utterance of the specified spelling in an audio session corresponding to the text transcription. A search result indicating that the transcript phoneme fragment and the associated portion of the text transcription is determined to result from the utterance is output.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 shows an example sequence of tokens corresponding to the text transcription shown in FIG. 3.

FIGS. 6-7 show example pre-processing operations performed on the sequence of tokens shown in FIG. 4.

FIG. 8 shows an example sequence of transcript phonemes corresponding to a text transcription.

DETAILED DESCRIPTION

Computer-generated text transcription provides various benefits that reduce time and effort to review and examine speech uttered during an audio session. In some examples, computer-based searching of a text transcription is performed to search for a word or phrase to review and examine. In one example, a "fuzzy" string matching technique is employed to search a text transcription for a word or words. However, fuzzy string matching suffers from inaccuracy in searching for some types of words. As one example, the fuzzy string matching technique struggles to accurately find words having an alternative spelling but produce the same sound (e.g., the names "Christina", "Cristina", "Kristina"). As another example, the fuzzy string matching technique struggles to accurately find words that are uncommon in transcription training data causing transcription into completely different words (e.g. the name "Soham" is transcribed into "so him", the name "Vandita" is transcribed into "Juanita").

Accordingly, the present description is directed to an approach for determining whether a word (or words) is present in a text transcription of human speech. According to the approach, a specified spelling of a word or words is received as input. A sequence of search phonemes corresponding to the specified spelling is generated. A sequence of transcript phonemes corresponding to the text transcription is generated from the text transcription. A search alignment in which the sequence of search phonemes is aligned to one or more transcript phoneme fragments is scored for quality of alignment. Based at least on the search alignment having a quality score exceeding a quality score threshold, the transcript phoneme fragment and an associated portion of the text transcription is determined to result from an utterance of the specified spelling.

Such a phoneme-based search approach that uses pronunciation alignment provides suitably robust and accurate performance, especially in cases of search words that sound the same as other words but have different spellings and search words that are commonly misspelled in the text transcription due to being underrepresented in training data of natural language models that produce the text transcription. In both these cases, fuzzy string matching has higher error rates of matching compared to the phoneme-based search approach using pronunciation alignment.

Figure 1:
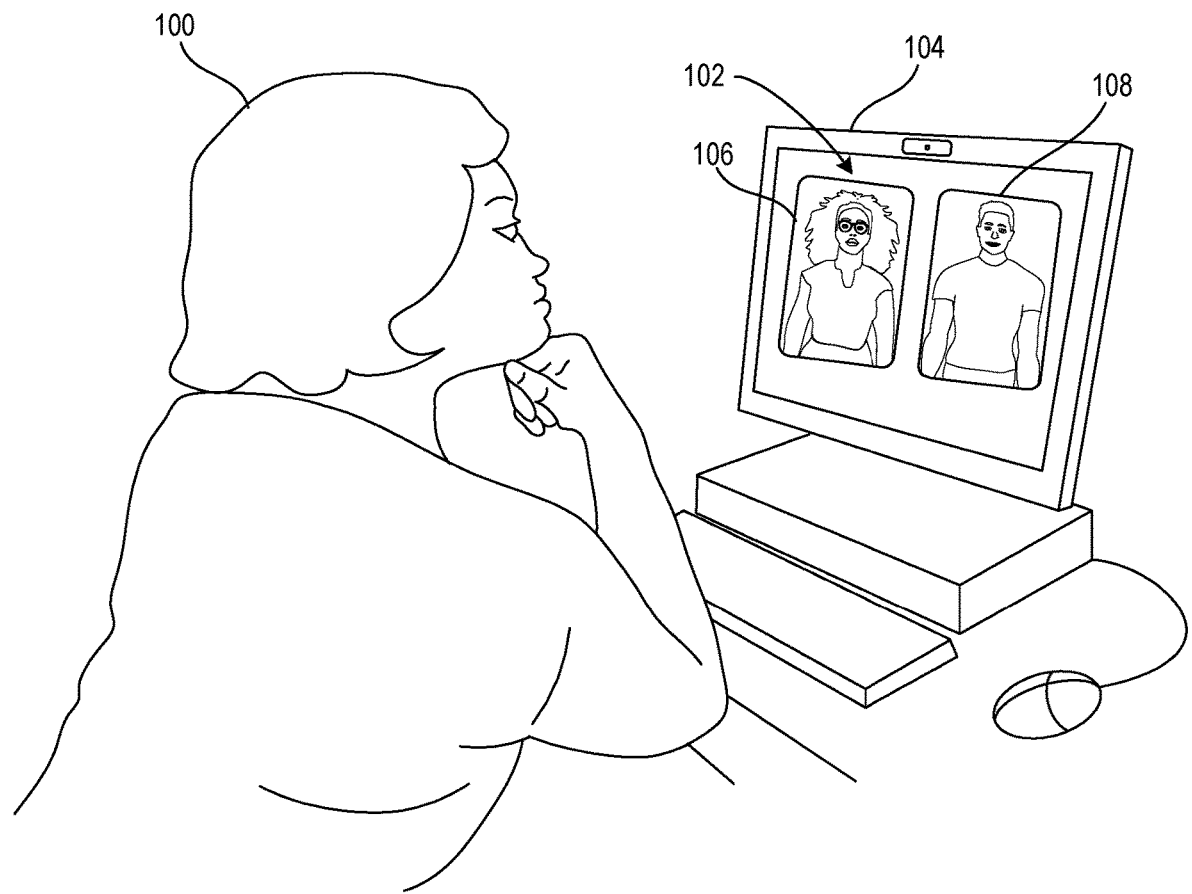
FIG. 1 shows an example scenario where a user is interacting with other users in an audio session from which a text transcription is produced by a computer.

FIG. 1 shows an example scenario where a first user 100 is virtually interacting with other users via a computer conference application 102 executed by a user computer 104. For example, the first user 100, a second user 106, and a third user 108 are work colleagues that are virtually meeting to discuss a work matter. The interaction is captured as an audio session (and optionally an audio/video session) by the computer conference application 102. Further, the computer conference application is configured to generate a text transcription of the audio session. For example, the text transcription is used subsequent to the audio session by one or more of the work colleagues to review notes from the meeting. In some examples, the computer conference application generates the text transcription "on the fly" substantially in real-time. In some examples, the computer conference application records the audio session and generates the text transcription at a subsequent time.

In this example, the different work colleagues reside in different geographic regions around the world, and thus interact using the computer conference application 102. 'Christina'— the first user 100 participates from Seattle in the United States. 'Claire'— the second user 106 participates from Paris in France. 'Soham'— the third user 108 participates from Mumbai in India. A natural language processing (NLP) model of the computer conference application 102 that is configured to generate the text transcription is trained using training data that primarily includes words in the English language and includes a limited number of words from other languages, such as people's names that are common in different non-English languages. Due to this factor and other factors, the text transcription produced by the computer conference application 102 has various spelling errors. Note that a "spelling error" includes 1) an actual incorrect spelling of a word or words or 2) that a correctly spelled word or words are produced in the transcript, but the word or words do not accurately reflect the actual word or actual spelling of the word uttered in the audio session. For example, 'Soham' is transcribed as the words 'so' 'him' in the text transcription. In this example, 'so' 'him' are correctly spelled words, however these words to not accurately reflect the actual words uttered in the audio session.

Figure 2:
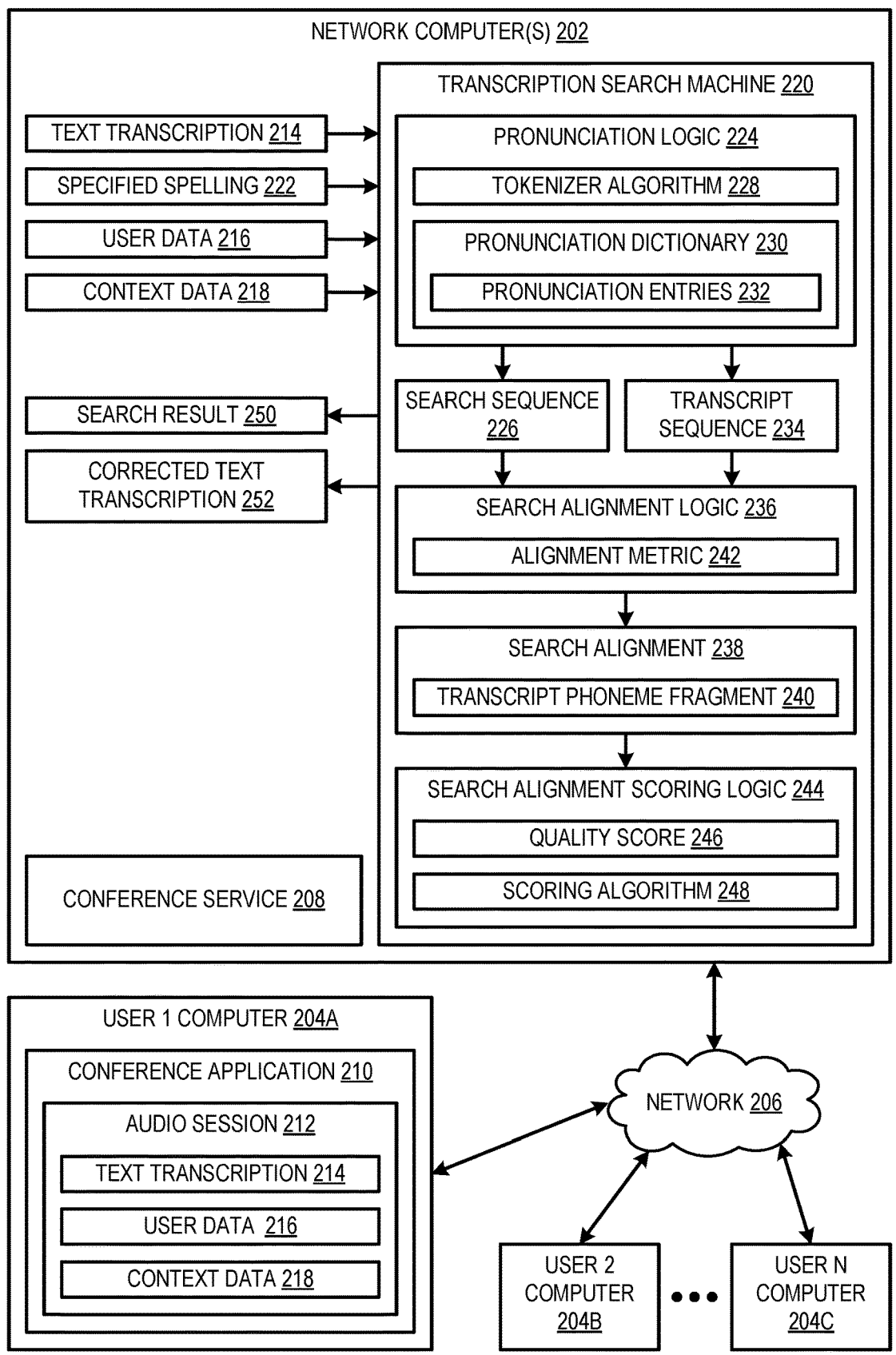
FIG. 2 shows an example computing system that is configured to perform a phoneme-based text transcription search approach.

In order to provide accurate search functionality for a word or words that were uttered during an audio session, the user computer 102 and/or cooperating network computers of a computing system 200 (shown in FIG. 2) is configured to perform a phoneme-based search approach using pronunciation alignment. Such a search approach can determine whether a word or words having a specified spelling were uttered during an audio session even if a fuzzy string matching search approach were to otherwise generate a different spelling than the specified spelling.

The computing system 200 includes one or more network computers 202 communicatively coupled with a plurality of different user computers (e.g., 204A, 204B, 204C). The different user computers 204A, 204B, 204C are associated with different users. For example, the first user computer 204A corresponds to the user computer 104 associated with the first user 100, the second user computer 204B is associated with the second user 106, and the Nth user computer 204C is associated with the third user 108 shown in FIG. 1 and discussed above. In some examples, multiple user computers are associated with the same user and user-specific interactions are tracked across all user computers associated with a particular user. Any suitable number of user computers may be communicatively coupled with the network computer(s) 202. The computing system 200 includes the network computer(s) 202 and the plurality of user computers 204.

The network computer(s) 202 are configured to execute a computer conference service 208, and the plurality of user computers 204A, 204B, 204C are configured to execute a computer conference application 210 (illustrated by representative user computer 204A). In some examples, the computer conference service 208 and the computer conference application 210 are configured to work in conjunction to initiate conference sessions between different users such that the different users virtually interact with each other via the computer conference application 210. The computer conference service 208 and/or the computer conference application 210 are configured to provide audio/video capabilities. In some examples, a conference session includes just audio capabilities akin to a "conference phone call." In other examples, a conference session includes audio and video capabilities akin to a "conference video call." The computer conference service 208 and/or the computer conference application 210 are configured to facilitate an audio session 212 in which one or more users utter speech that is detected and/or recorded by the computer conference service 208 and/or the computer conference application 210. Note that such audio detection and/or recording (as well as transcription and data tracking) is only performed by the computer conference service 208 and/or the computer conference application 210 based at least on consent from the participants of the audio session 212.

The computer conference service 208 and/or the computer conference application 210 are configured to convert speech uttered by one or more speakers during the audio session 212 into a text transcription 214. The computer conference service 208 and/or the computer conference application 210 may employ any suitable NLP model to generate the text transcription 214. In some examples, the computer conference service 208 and/or the computer conference application 210 generates the text transcription "on the fly" substantially in real-time. In some examples, the computer conference service 208 and/or the computer conference application 210 records the audio session and generates the text transcription at a subsequent time.

In some implementations, the computer conference service 208 and/or the computer conference application 210 are configured to generate and/or track user data 216 based at least on personal information of each user that is participating in the audio session 212. For example, user data 216 for a user is saved as part of a user profile that is maintained across multiple audio sessions and other virtual interactions. Further, the computer conference service 208 and/or the computer conference application 210 is configured to obtain user data 216 in other manners, such as explicitly requesting the user data 216 from the user and/or inferring the user data 216 based at least on user actions. The user data 216 may be obtained for a user in any suitable manner.

The user data 216 includes any suitable type of data that is used to characterize an attribute of a user in terms of natural language processing. Non-limiting examples of attributes that characterize different users include a name of a user, a native language spoken by the user, a social network graph of other users with which the user interacts, age, occupation, area of study in school, a geographic region in which the user resides, and a geographic region in which the user works or goes to school.

In some implementations, the computer conference service 208 and/or the computer conference application 210 are configured to generate and/or track context data 218 related to the audio session 212. The context data 218 includes topics, keywords, or terms that are uttered during the audio session 212 that provide context to what is being uttered during the audio session 212. Non-limiting examples of context data 218 includes locations, times, dates, people's names, work topics, and school topics.

In some implementations, the user data 216 and/or the context data 218 is used in the phoneme-based search approach as will be discussed in further detail below.

The computer conference service 208 and/or the computer conference application 210 are provided as non-limiting examples of computer programs that are configured to generate an audio session from which a text transcription can be computer-generated. In other examples, a different type of computer program can generate the audio session 212 and/or the text transcription 214. The phoneme-based search approach is broadly applicable to search any suitable text transcription generated by any suitable computer application program or computer service. The phoneme-based search approach even may be used to search a text transcription with a single speaker, such as a text transcription generated by a dictation application program.

As discussed above, text transcriptions reduce time and effort to review and examine speech uttered during an audio session. Further, the ability to search a text transcription for particular search terms further reduces the time and effort to review and examine said speech. To this end, the network computer(s) 202 include a transcription search machine 220 configured to determine whether a search term—i.e., a word or words having a specified spelling were uttered during an audio session by that was computer-processed to produce a text transcription. The transcription search machine 220 is configured to receive as input a text transcription, such as the text transcription 214 generated from the audio session 212.

Figure 3:
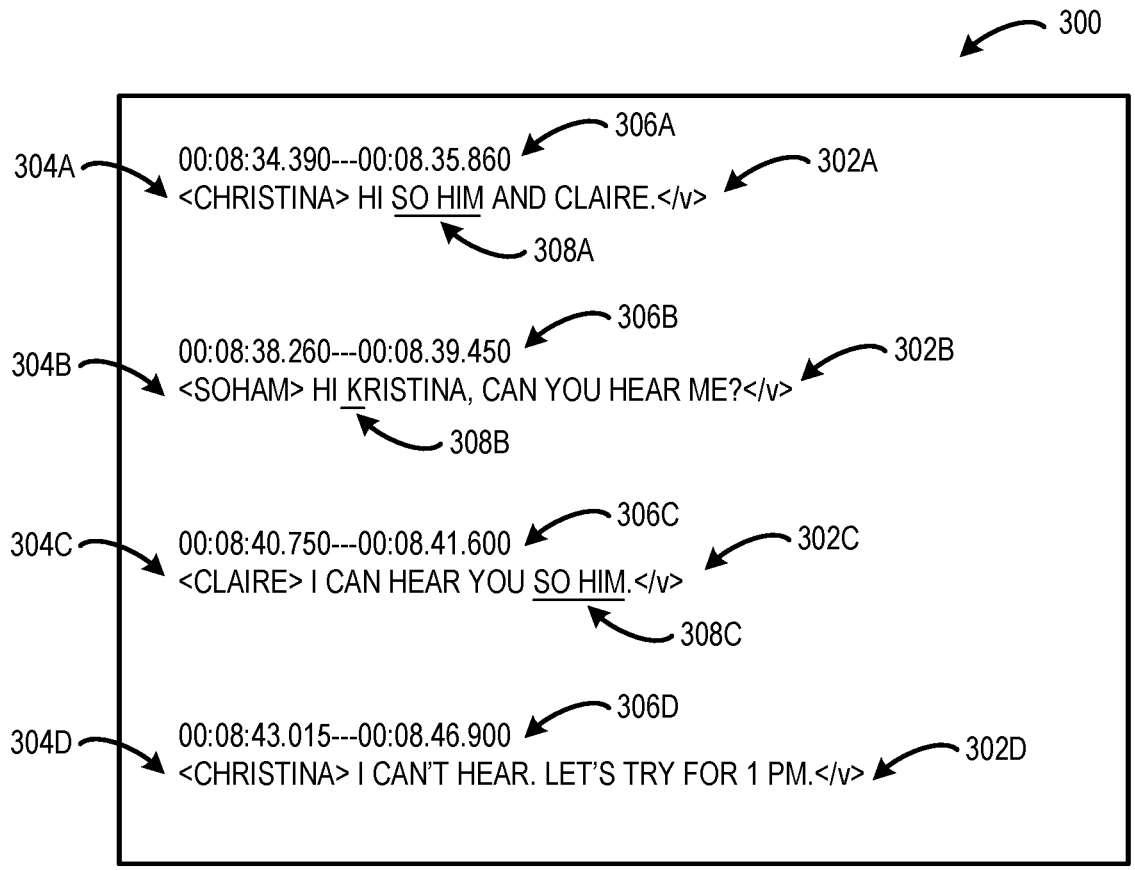
FIG. 3 shows an example text transcription.

FIG. 3 shows an example text transcription 300. For example, the text transcription 300 may be generated from speech uttered during the audio session of the example scenario shown in FIG. 1. The text transcription 300 may further correspond to the text transcription 214 shown in FIG. 2. The text transcription 300 includes a plurality of text segments 302A, 302B, 302C, 302D. Note that the text segments 302A, 302B, 302C, 302D include letters that form words, as well as numbers, and punctuation. The text segments 302A, 302B, 302C, 302D have different speaker attributions 304A, 304B, 304C, 304D. Also, the text segments 302A, 302B, 302C, 302D have different timestamps 306A, 306B, 306C, 306D that specify an order in which speech corresponding to the different text segments were uttered during the audio session.

In the illustrated example, the first text segment 302A—"HI SO HIM AND CLAIRE." is attributed to a first speaker, Christina. The second text segment 302B—"HI KRISTINA, CAN YOU HEAR ME?" is attributed to a second speaker, Soham. The third text segment 302C—"I CAN HEAR YOU SO HIM." is attributed to a third speaker, Claire. The fourth text segment 302D—"I CAN'T HEAR. LET'S TRY FOR 1 PM." is attributed to the first speaker, Christina.

The text transcription 300 includes several spelling errors. A first spelling error 308A misinterprets the name 'Soham' as the words 'so him.' A second spelling error 308B misspells the name 'Christina' as the word 'Kristina.' A third spelling error 308C misinterprets the name 'Soham' again as the words 'so him.'

Returning to FIG. 2, the transcription search machine 220 is configured to receive as input a search term having a specified spelling 222. The search term having the specified spelling 222 may be received from any suitable source. In some examples, the search term is included in a search query that is received from a user via user input. In some examples, the search term is included in a search query that is received from a computer application program, a computer service, or another computer-based source.

The transcription search machine 220 is configured to apply the search term having the specified spelling 222 to the text transcription 214 to determine whether the search term was uttered during the audio session 212. The phoneme-based search approach described herein can accurately determine whether a word or words having a specified spelling were uttered during the audio session even if the words are misspelled in the text transcription. Thus, in this example text transcription shown in FIG. 3, a search for a word having the correct spelling may still provide an accurate result even if the word is misspelled in the text transcription.

In some implementations, the transcription search machine 220 receives user data 216 and context data 218 associated with the text transcription 214 and/or audio session 212. In some examples, the transcription search machine 220 uses the user data 216 and/or the context data 218 to provide accurate search terms and/or search results. In some examples, the specified spelling 222 of the search term is a name of a participant in the audio session 212, and the transcription search machine 220 determines the specified spelling of the name from the user data 216. In some examples, the specified spelling of the search term is based on user data 216 extracted from a user profile associated with a participant in the audio session 212. For example, the user data 216 includes a location of residence, a company name, or other suitable forms of user data that is included in the user profile. In these scenarios, the user data 216 and/or the context data 218 in conjunction with the search term are used to disambiguate multiple possible pronunciations of a word or words that are connected with a particular utterance beyond just the text in the text transcription and in the larger computing environment.

In some examples, the transcription search machine 220 uses the user data 216 and/or the context data 218 to perform additional or alternative processing operations on the text transcription 214.

The transcription search machine 220 includes pronunciation logic 224 configured to generate a sequence of search phonemes 226 corresponding to the specified spelling 222 of the word or words input as the search term. The pronunciation logic 224 may be configured to generate the sequence of search phonemes 226 from the specified spelling 222 in any suitable manner.

In one example, the pronunciation logic 224 is configured to tokenize the specified spelling 222 of the search term into a sequence of tokens using a tokenizer algorithm 228. The pronunciation logic 224 may user any suitable tokenizer algorithm. In one example, the pronunciation logic 224 uses a Bidirectional Encoder Representations from Transformers (BERT) tokenizer algorithm to tokenize the specified spelling 222 of the search term into a sequence of tokens. In some examples, the sequence includes a single word token. In other examples, the sequence includes a plurality of word tokens.

Further, the pronunciation logic 224 is configured to look up a pronunciation of each token in the sequence in a pronunciation dictionary 230. The pronunciation dictionary 230 includes a plurality of pronunciation entries 232. Each pronunciation entry includes one or more phonemes corresponding to a word or word piece. The pronunciation logic 224 may employ any suitable pronunciation dictionary. In one example, the pronunciation logic 224 employs the Carnegie-Melon University pronunciation dictionary to lookup tokens.

If the pronunciation dictionary 230 includes an existing pronunciation entry 232 corresponding to the token that was looked up, then the pronunciation logic 224 is configured to add one or more phonemes of the existing pronunciation entry corresponding to the token to the sequence of search phonemes 226.

If the pronunciation dictionary 230 does not include an existing pronunciation entry 232 corresponding to the token, then the pronunciation logic 224 is configured to split the token into a plurality of word-piece tokens/sub-word tokens. In some examples, the pronunciation logic 224 is configured to split the token into the plurality of word-piece tokens using the tokenizer algorithm 228 (e.g., the BERT tokenizer algorithm). Each word-piece token has an existing pronunciation entry in the pronunciation dictionary 230. Further, the pronunciation logic 224 is configured to, for each word-piece token of the plurality of word-piece tokens, add one or more phonemes of the existing pronunciation entry corresponding to the word-piece token to the sequence of search phonemes 226. In some examples, the phonemes corresponding to the word-piece tokens are concatenated to form a single word in the sequence of search phonemes. This lookup process is performed for each token in the sequence of tokens corresponding to the specified spelling 222 of the search term to generate the sequence of search phonemes 226.

Figure 4:
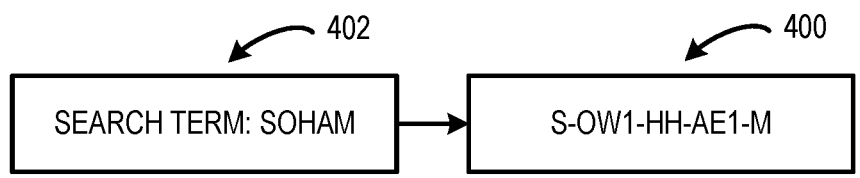
FIG. 4 shows an example sequence of search phonemes corresponding to a specified spelling of a search term.

FIG. 4 shows an example sequence of search phonemes 400 corresponding to a specified spelling of a search term 402. In the illustrated example, the search term 402 is 'SOHAM' and the corresponding sequence of search phonemes 400 is 'SOHAM.' In one example, the sequence of search phonemes 400 is generated by the pronunciation logic 224 according to the process described above.

Returning to FIG. 2, the pronunciation logic 224 is configured to generate a sequence of transcript phonemes 234 corresponding to the text transcription 214. The pronunciation logic 224 may be configured to generate the sequence of transcript phonemes 234 from the text transcription 214 in any suitable manner.

In one example, the pronunciation logic 224 is configured to tokenize the text transcription 214 into a sequence of tokens using the tokenizer algorithm 228. In some examples, the sequence of tokens generated from the text transcription 214 includes word tokens, number tokens, punctuation tokens, and/or other types of tokens. FIG. 5 shows an example sequence of tokens 500 corresponding to the text transcription 300 shown in FIG. 3. Note that the sequence of tokens 500 includes word tokens, number tokens, and punctuation tokens.

In some implementations, the pronunciation logic 224 is configured to perform various per-processing operations as part of generating the sequence of transcript phonemes 234 in order to make downstream processing more efficient.

In some implementations, the pronunciation logic 224 is configured to convert number tokens in the sequence of tokens into word tokens equivalent to the number tokens. FIG. 6 shows an example sequence of tokens 600 corresponding to the sequence of tokens 500 shown in FIG. 5. At 602, the number '1' that was in the sequence of tokens 500 is replaced with the equivalent word 'ONE' in the sequence of tokens 600.

In some implementations, the pronunciation logic 224 is configured to remove non-pronounceable tokens from the sequence of tokens. Non-limiting examples of non-pronounceable tokens include punctuation tokens, spacing tokens, filler tokens, and special tokens. The pronunciation logic 224 may be configured to remove any suitable type of non-pronounceable token from the sequence of tokens. FIG. 7 shows an example sequence of tokens 700 corresponding to the sequence of tokens 600 shown in FIG. 6 after the punctuation tokens have been removed, such that the sequence of tokens 700 only includes word tokens.

Once the pre-processing operations are completed, the pronunciation logic 224 is configured to look up a pronunciation of each token in the sequence in the pronunciation dictionary 230. If the pronunciation dictionary 230 includes an existing pronunciation entry 232 corresponding to the token that was looked up, then the pronunciation logic 224 is configured to add one or more phonemes of the existing pronunciation entry corresponding to the token to the sequence of transcript phonemes 234.

If the pronunciation dictionary 230 does not include an existing pronunciation entry 232 corresponding to the token, then the pronunciation logic 224 is configured to split the token into a plurality of word-piece tokens that each have an existing pronunciation entry in the pronunciation dictionary 230. Further, the pronunciation logic 224 is configured to, for each word-piece token of the plurality of word-piece tokens, add one or more phonemes of the existing pronunciation entry corresponding to the word-piece token to the sequence of transcript phonemes 234. In some examples, the phonemes corresponding to the word-piece tokens are concatenated to form a single word in the sequence of transcript phonemes. This lookup process is performed for each token in the sequence of tokens corresponding to the text transcription 214. FIG. 8 shows an example sequence of transcript phonemes 800 corresponding to the text transcription 300 shown in FIG. 3 after pre-processing operations have been performed to convert numbers to words and remove non-pronounceable tokens.

The transcription search machine 220 includes search alignment logic 236 that is configured to generate a search alignment 238 in which the sequence of search phonemes 226 is aligned to a transcript phoneme fragment 240 in the sequence of transcript phonemes 234. The transcript phoneme fragment 240 is a subset of the sequence of transcript phonemes 234. The search alignment logic 236 is configured to use localized, dynamic alignment of the sequence of search phonemes 226 with phonemes of the sequence of transcript phonemes 234 to find a suitable alignment. In some examples, the search alignment logic 236 is configured to iteratively compare the sequence of search phonemes 226 to different candidate fragments in the sequence of transcript phonemes 234 to find a suitable search alignment.

In one example, the search alignment logic 236 uses an alignment metric 242 to determine whether a search alignment is generated. The alignment metric 242 provides an initial minimum threshold that qualifies different fragments in the sequence of transcript phonemes 234 as potential matches to the sequence of search phonemes 226. In some examples, the search alignment logic 236 is configured to compare and score an alignment of the sequence of search phonemes 226 to a candidate fragment in the sequence of transcript phonemes 234 at the phoneme (or character) level.

In some examples, the alignment metric 242 is derived from the Needleman-Wunsch alignment algorithm. In one example, alignment metric 242 awards 2 points for correct matches between the sequence of search phonemes 226 and a given fragment, a 1-point penalty for mismatches, a 1-point penalty for opening gaps in the alignment, and a 1-point penalty for extended gaps in the alignment. The alignment metric 242 dictates that if the alignment score of a candidate alignment is greater than an alignment threshold the search alignment is generated. The alignment threshold may be set to any suitable threshold that meets the accuracy tolerances of the search application. Note that the alignment score used by the alignment metric 242 provides a minimum bar to generate a search alignment that will be assessed downstream for a quality of the match. The alignment score does not determine the quality of the search alignment, and instead provides a mechanism for generating candidate search alignments that are subsequently scored for quality using a scoring algorithm.

In one example, a search string "ABCAA" is compared to a sequence "ABBBA" using the alignment metric 242. Note that characters are used in place of phonemes in this example for ease of understanding, but the same concepts apply to phonemes. The search alignment logic 236 determines that the alignment "A-BCAA" produces the highest overall alignment score of different possible alignments based on the alignment metric 242. In particular, the highest scoring alignment starts at the first character for both strings, a gap exists at the second character of the search string, and a mismatch occurs at the 4th character of both strings. This results in an overall alignment score of 6 (i.e., − the first character matched for 2 points, plus the second character gap of −1 point, plus the third character match of 2 points, plus the fourth character mismatch of −1 point, plus the fifth character match of 2 points, plus the last character match of 2 points).

In another example, the search string "ABCAA" is compared to a longer sequence "ABBBABCAB" using the alignment metric 242. The search alignment logic 236 determines that the highest scoring alignment of all possible alignments occurs starting at the first character for the search string and the fifth character for the sequence, and that a matching sub string is one character short of the search string. In this form, all 4 characters match for 2 points each, amounting to an alignment score of 8 points.

In the above examples, the alignment scores of the search sequences are suitably high enough to generate a search alignment that is subsequently scored for quality. Other candidate alignments having lower alignment scores are disregarded. In other words, those candidate alignments do not generate a search alignment.

Figure 9:
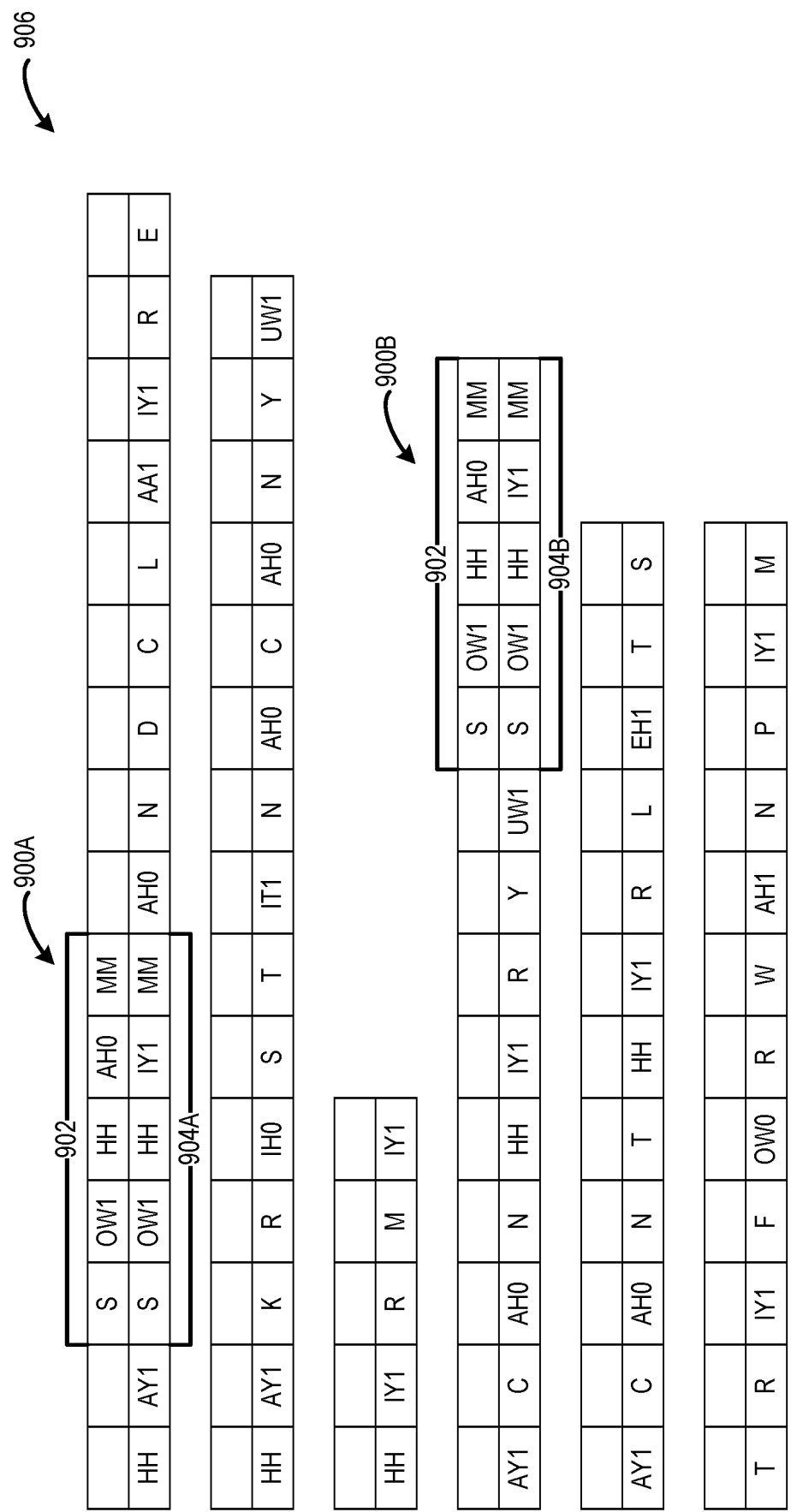
FIG. 9 shows example search alignments in which a sequence of search phonemes is aligned to different transcript phoneme fragments.

FIG. 9 shows example search alignments 900A, 900B in which a sequence of search phonemes 902 is aligned to different transcript phoneme fragments 904A, 904B in a sequence of transcript phonemes 906. The sequence of transcript phonemes 906 corresponds to the sequence of transcript phonemes 800 shown in FIG. 8. The sequence of search phonemes 902 corresponds to the sequence of search phonemes 400 shown in FIG. 4. In the illustrated example, a first search alignment 900A is generated based at least on a match between the sequence of search phonemes 902 and a first transcript phoneme fragment 904A that satisfies the alignment metric 242. A second search alignment 900B is generated based at least on a match between the sequence of search phonemes 902 and a second transcript phoneme fragment 904B that satisfies the alignment metric 242. In both cases, the search alignments 900A, 900B compare phonemes corresponding to the text SOHAM' with phonemes corresponding to the text SO HIM' found in different locations within the sequence of transcript phonemes 906.

Returning to FIG. 2, the transcription search machine 220 includes search alignment scoring logic 244 configured to determine a quality score 246 of a search alignment, such as the search alignment 238 using a scoring algorithm 248. In one example, the scoring algorithm 248 is a Levenshtein distance, and the quality score is based at least on a Levenshtein distance between the sequence of search phonemes 226 and the transcript phoneme fragment 240. For example, the Levenshtein distance is determined according to a minimum number of character edits (additions, deletions, and substitutions) to arrive at an exact match. In this case, a search alignment having a shorter Levenshtein distance correspondingly has a higher quality score. In some examples, the scoring algorithm 248 normalizes the quality score 246 according to a length of the sequence of search phonemes 226. To normalize the Levenshtein distance, the minimum number of character edits would be divided by the number of characters in the search sequence. In other examples, other scoring algorithms may be used, such as a Hamming distance, or a Jaro distance. The search alignment scoring logic 244 may be configured to determine a quality score of a search alignment using any suitable scoring algorithm.

The search alignment scoring logic 244 is configured to compare the quality score 246 of the search alignment 238 to a quality score threshold. The quality score threshold may be set to any suitable score depending on the robustness tolerances of the particular search. If the quality score 246 exceeds the quality score threshold, then the transcript phoneme fragment 240 is deemed suitable similar enough to "match" the sequence of search phonemes 226. In other words, the search alignment scoring logic 244 determines that the transcript phoneme fragment 240 and an associated portion of the text transcription 214 resulted from an utterance of the specified spelling 222 in the audio session 212.

Returning to the example shown in FIGS. 3-9, even though the text transcription misinterpreted the name "SOHAM" as the words "SO" and "HIM," the phoneme-based search approach is able to determine that the portion of the text transcription actually resulted from the utterance of the specified spelling of the search term in the audio session instead of the misinterpreted text.

As another example, in the text segment 302B of the text transcription 300, an utterance of the name 'CHRISTINA' is misspelled as 'KRISTINA.' If a search was performed by the transcription search machine 220 for the search term having the specified spelling 'CHRISTINA' on the text transcription 300. The transcription search machine 220 would output a search result determining that a transcript phoneme fragment corresponding to 'KRISTINA' resulted from an utterance of 'CHRISTINA' in the audio session. The transcription search machine 220 is able to produce this type of search result with high accuracy due to the phoneme-based search approach in which a pronunciation of the search term is aligned to the pronunciation of the transcript within an error tolerance, i.e., a search alignment having a quality score above a quality score threshold.

The transcription search machine 220 is configured to output a search result 250 that indicates whether the transcript phoneme fragment 240 and an associated portion of the text transcription resulted from an utterance of the specified spelling 222. In other words, the search result 250 can indicate whether a potentially underrepresented word is present in the text transcription even if the word is misspelled or misinterpreted in the text transcription. In some examples, the transcription search machine 220 outputs the search result 250 to a user computer, such as the first user computer 204A. For example, the search result 250 is output responsive to a search query sent from the first user computer 204A. In some examples, the transcription search machine 220 outputs the search result 250 to another computer program, so that the search result 250 can be used for downstream computing operations.

In some implementations, in examples where a specified spelling of a search term is determined to be present in a text transcription, the transcription search machine 220 is configured replace the associated portion of the text transcription with the specified spelling to generate a corrected text transcription 252. The transcription search machine 220 may be configured to correct any suitable errors in a text transcription based at least on results of searches to generate the corrected text transcription 252. In such implementations, the transcription search machine 220 is configured to output the corrected text transcription 252 to a recipient. The corrected text transcription 252 may be output to any suitable recipient. In some examples, the corrected text transcription 252 is output to a user via a display. In some examples, the corrected text transcription 252 is output to a computer application program, a computer service, or another computer-based recipient. In some examples, the corrected text transcription 252 is stored in memory or a computer-storage device.

In some implementations, the transcription search machine 220 may be configured to replace the associated portion of the text transcription with the specified spelling based at least on a context data 218 of the audio session. For example, context data includes names of speakers attributed to different text segments in the text transcription, times, dates, locations, topics of conversation, or various keywords that describe the context of the audio session.

In one example an audio session includes participants named 'CHRISTINA' and "KRISTINA," and the text transcription has a portion of text that is misspelled as 'CRISTINA.' The transcription search machine 220 may use the context data 218 to distinguish what the correct spelling of the text should be. In particular, the context data 218 indicates that the misspelled text 'CRISTINA' was included in an utterance spoken by 'CHRISTINA,' which was directed to the other participant—i.e., 'KRISTINA.' Accordingly, the transcription search machine 220 determines that the misspelled text actually corresponds to the spelling 'KRISTINA' and can make appropriate corrections as desired. The transcription search machine 220 may be configured to make any suitable determinations of the presence of a search term in a text transcription based at least on any suitable type of context data of an audio session.

The transcription search machine 220, the pronunciation logic 224, the search alignment logic 236, and the search alignment scoring logic 244 may be implemented using any suitable configuration of hardware/software/firmware components. In some examples, the transcription search machine 220 may employ any suitable combination of state-of-the-art and/or future machine learning (ML), artificial intelligence (AI), and/or other natural language processing (NLP) techniques.

Figure 10:
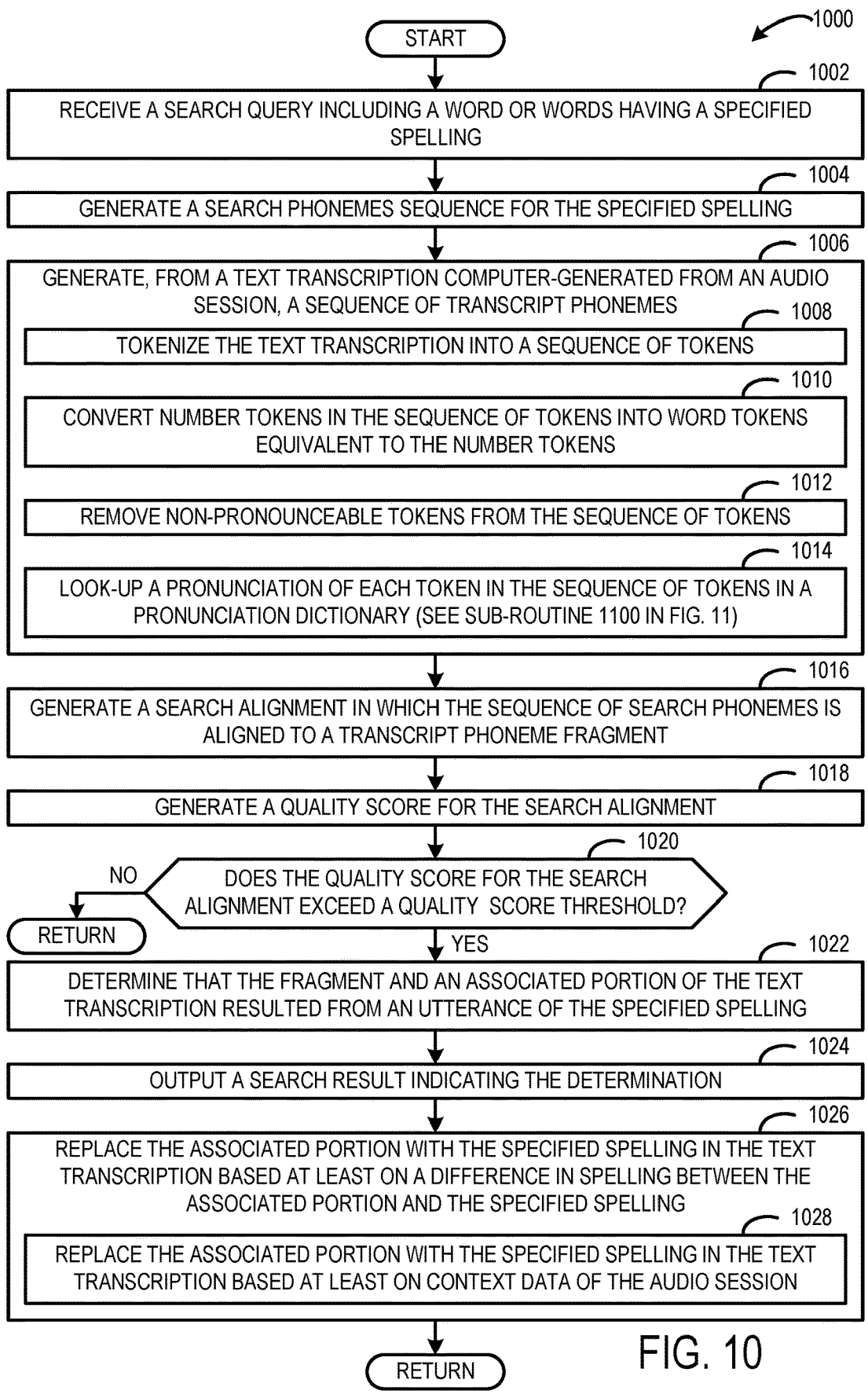
FIG. 10 shows an example method of determining whether a word or words having a specified spelling were uttered during an audio session that was computer-processed to produce a text transcription.

FIG. 10 shows an example method 1000 of determining whether a word or words having a specified spelling were uttered during an audio session that was computer-processed to produce a text transcription. For example, the method 1000 may be performed by one or more of the computers of the computing system 200 shown in FIG. 2.

At 1002, the method 1000 includes receiving a search query to search the text transcription. The search query includes a word or words having a specified spelling. The search query may be received from any suitable source. In some examples, the search query is received from a user via user input. In some examples, the search query is received from a computer application program, a computer service, or another computer-based source.

At 1004, the method 1000 includes generating a sequence of search phonemes corresponding to the specified spelling of the word or words of the search query. For example, the sequence of search phonemes is generated using a tokenizer algorithm, such as the BERT tokenizer algorithm.

At 1006, the method 1000 includes generating, from a text transcription computer-generated from an audio session, a sequence of transcript phonemes corresponding to the text transcription.

In some implementations, at 1008, generating the sequence of transcript phonemes includes tokenizing the text transcription into a sequence of tokens. For example, the sequence of search phonemes is generated using a tokenizer algorithm, such as the BERT tokenizer algorithm. In some implementations, at 1010, generating the sequence of transcript phonemes includes converting number tokens in the sequence of tokens into word tokens equivalent to the number tokens. In some implementations, at 1012, generating the sequence of transcript phonemes includes removing non-pronounceable tokens from the sequence of tokens. In some implementations, at 1014, generating the sequence of transcript phonemes includes looking-up a pronunciation of each token in the sequence of tokens in a pronunciation dictionary.

Figure 11:
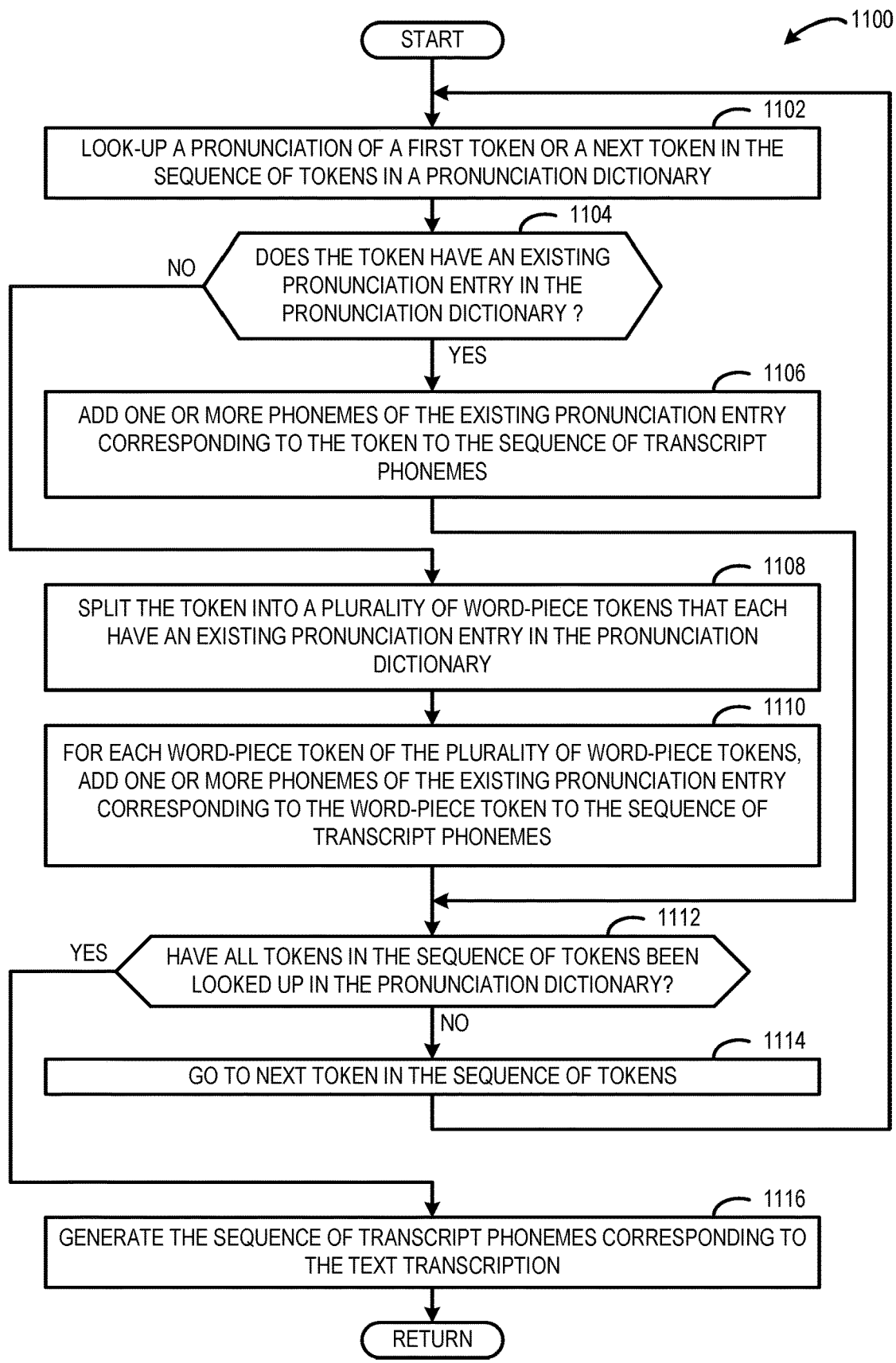
FIG. 11 shows an example sub-routine of the method shown in FIG. 10 for looking up pronunciations of tokens in a pronunciation dictionary.

FIG. 11 shows an example sub-routine 1100 of the method 1000 shown in FIG. 10 for looking up pronunciations of tokens in a pronunciation dictionary.

At 1102, the sub-routine 1100 includes looking-up a pronunciation of a first token or a next token in the sequence of tokens in a pronunciation dictionary. The pronunciation dictionary includes a plurality of pronunciation entries. Each pronunciation entry includes one or more phonemes corresponding to the pronunciation of a word or word-piece.

At 1104, the sub-routine 1100 includes determining whether the token has an existing pronunciation entry in the pronunciation dictionary. If the token does have an existing pronunciation entry in the pronunciation dictionary, then the sub-routine 1100 moves to 1106. Otherwise, the sub-routine 1100 moves to 1108.

If the token does have an existing pronunciation entry in the pronunciation dictionary, at 1106, the sub-routine 1100 includes adding one or more phonemes of the existing pronunciation entry corresponding to the token to the sequence of transcript phonemes and the sub-routine moves to 1112.

If the token does not have an existing pronunciation entry in the pronunciation dictionary, at 1108, the sub-routine 1100 includes splitting the token into a plurality of word-piece tokens that each have an existing pronunciation entry in the pronunciation dictionary. At 1110, the sub-routine 1100 includes for each word-piece token of the plurality of word-piece tokens, add one or more phonemes of the existing pronunciation entry corresponding to the word-piece token to the sequence of transcript phonemes.

At 1112, the sub-routine 1100 includes determining if all tokens in the sequence of tokens have been looked-up in the pronunciation dictionary. If all tokens in the sequence of tokens have been looked-up in the pronunciation dictionary, then the sub-routine 1100 moves to 1116. Otherwise, the sub-routine 1100 moves to 1114.

At 1114, the sub-routine 1100 includes going to the next token in the sequence of tokens and the sub-routine 1100 returns to 1102 to lookup the next token in the pronunciation dictionary. This process is repeated until all tokens in the sequence of tokens has been looked-up in the pronunciation dictionary.

At 1116, all of the tokens have been looked up in the pronunciation dictionary and the sub-routine 1100 includes generating the sequence of transcript phonemes corresponding to the text transcription. Once the sequence of transcript phonemes has been generated, the sub-routine 1100 returns to 1016 of the method 1000 shown in FIG. 10.

Returning to FIG. 10, at 1016, the method 1000 includes generating a search alignment in which the sequence of search phonemes is aligned to a transcript phoneme fragment that is a subset of the sequence of transcript phonemes.

At 1018, the method 1000 includes generating a quality score for the search alignment. For example, the quality score is determined using a scoring algorithm, such as a normalized Levenshtein distance scoring algorithm.

At 1020, the method 1000 includes determining if the quality score of the search alignment exceeds a quality score threshold. If the quality score of the search alignment exceeds a quality score threshold, then the method 1000 moves to 1022. Otherwise, the search alignment does not have high enough quality to make a determination about the presence of the search term in the text transcription and the method 1000 returns to other operations.

At 1022, the method 1000 includes determining that the transcript phoneme fragment and an associated portion of the text transcription resulted from an utterance of the specified spelling based at least on the search alignment having a quality score exceeding a quality score threshold.

At 1024, the method 1000 includes outputting a search result indicating that the transcript phoneme fragment and the associated portion of the text transcription resulted from an utterance of the specified spelling based on the determination. The search result may be output in response to the search query. In some examples, the search result is output to a user via a display. In some examples, the search result is output to a computer application program, a computer service, or another computer-based source. In some examples, the search result is stored in memory or a computer-storage device.

In some implementations, at 1026, the method 1000 includes replacing the associated portion with the specified spelling in the text transcription based at least on a difference in spelling between the associated portion and the specified spelling. Such a replacement operation generates a corrected text transcription that more accurately tracks the speech of the audio session. In such implementations, the method 1000 includes outputting the corrected text transcription. The corrected text transcription may be output to any suitable recipient. In some examples, the corrected text transcription is output to a user via a display. In some examples, the corrected text transcription is output to a computer application program, a computer service, or another computer-based recipient. In some examples, the corrected text transcription is stored in memory or a computer-storage device.

In some implementations, at 1028, the method 1000 includes replacing the associated portion with the specified spelling in the text transcription based at least on context data from the audio session to generate a corrected text transcription. For example, context data includes names of participants in the audio session, speaker attributions, user data extracted from a user profile, topic keywords, and other suitable contextual information of the audio session. In some examples, the context data is used to disambiguate multiple possible pronunciations of a word or words that are connected with a particular utterance. In such implementations, the method 1000 includes outputting the corrected text transcription.

The above-described method implements phoneme-based searching that uses pronunciation alignment to provide suitably robust and accurate performance. The method is especially suited to determining whether search words that are commonly misspelled in the text transcription due to being underrepresented in training data of natural language models that produce the text transcription are present in the text transcription. Also, the method is suited to determining whether search words that sound the same as other words but have different spellings are present in the text transcription. In both these cases, fuzzy string matching has higher error rates of matching compared to the method. The phoneme-based searching that uses pronunciation alignment provides the technical benefit of providing improved search accuracy, which equates to reduced processing time and improved analysis performance.

In some implementations, the methods and processes described herein may be tied to a computing system of one or more computing devices. In particular, such methods and processes may be implemented as a computer-application program or service, an application-programming interface (API), a library, and/or other computer-program product.

Figure 12:
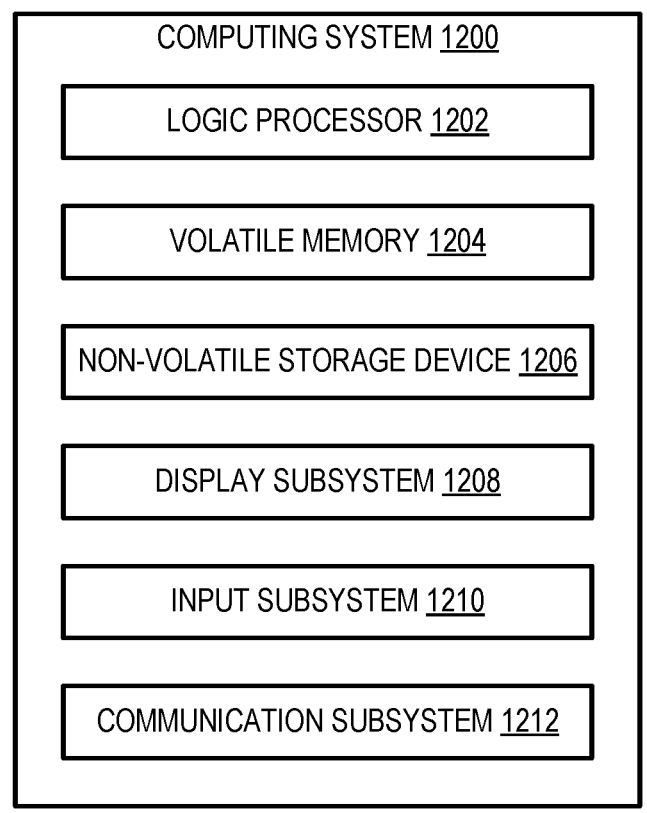
FIG. 12 shows an example computing system.

FIG. 12 schematically shows a non-limiting implementation of a computing system 1200 that can enact one or more of the methods and processes described above. Computing system 1200 is shown in simplified form. Computing system 1200 may embody the computing system 200 including the network computer(s) 202 and the plurality of user computers 204 described above and illustrated in FIG. 2. Further, the computing system 1200 may embody the user computer 102 shown in FIG. 1. Computing system 1200 may take the form of one or more personal computers, server computers, tablet computers, home-entertainment computers, network computing devices, gaming devices, mobile computing devices, mobile communication devices (e.g., smart phone), head-mounted augmented/mixed virtual reality devices, and/or other computing devices.

Computing system 1200 includes a logic processor 1202, volatile memory 1204, and a non-volatile storage device 1206. Computing system 1200 may optionally include a display subsystem 1208, input subsystem 1210, communication subsystem 1212, and/or other components not shown in FIG. 12.

Logic processor 1202 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 1202 may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1202 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 1206 includes one or more physical devices configured to hold instructions executable by the logic processors to implement the methods and processes described herein. When such methods and processes are implemented, the state of non-volatile storage device 1206 may be transformed—e.g., to hold different data.

Non-volatile storage device 1206 may include physical devices that are removable and/or built-in. Non-volatile storage device 1206 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1206 may include nonvolatile, dynamic, static, read/write, read-only, sequential-access, location-addressable, file-addressable, and/or content-addressable devices. It will be appreciated that non-volatile storage device 1206 is configured to hold instructions even when power is cut to the non-volatile storage device 1206.

Volatile memory 1204 may include physical devices that include random access memory. Volatile memory 1204 is typically utilized by logic processor 1202 to temporarily store information during processing of software instructions. It will be appreciated that volatile memory 1204 typically does not continue to store instructions when power is cut to the volatile memory 1204.

Aspects of logic processor 1202, volatile memory 1204, and non-volatile storage device 1206 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "machine" and "logic" may be used to describe an aspect of computing system 1200 typically implemented by a processor to perform a particular function using portions of volatile memory, which function involves transformative processing that specially configures the processor to perform the function. Thus, a machine/logic may be instantiated via logic processor 1202 executing instructions held by non-volatile storage device 1206, using portions of volatile memory 1204. It will be understood that different machines/logic may be instantiated from the same application, service, code block, object, library, routine, API, function, pipeline, etc. Likewise, the same machine/logic may be instantiated by different applications, services, code blocks, objects, routines, APIs, functions, etc. The terms "machine" and "logic" may encompass individual or groups of executable files, data files, libraries, drivers, scripts, database records, etc.

Any of the machine-learning analysis described above may be implemented using any suitable combination of state-of-the-art and/or future machine learning (ML), artificial intelligence (AI), and/or other natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

When the methods and processes described herein incorporate ML and/or AI components, the ML and/or AI components may make decisions based at least partially on training of the components with regard to training data. Accordingly, the ML and/or AI components can and should be trained on diverse, representative datasets that include sufficient relevant data for diverse users and/or populations of users. In particular, training data sets should be inclusive with regard to different human individuals and groups, so that as ML and/or AI components are trained, their performance is improved with regard to the user experience of the users and/or populations of users.

ML and/or AI components may additionally be trained to make decisions so as to minimize potential bias towards human individuals and/or groups. For example, when AI systems are used to assess any qualitative and/or quantitative information about human individuals or groups, they may be trained so as to be invariant to differences between the individuals or groups that are not intended to be measured by the qualitative and/or quantitative assessment, e.g., so that any decisions are not influenced in an unintended fashion by differences among individuals and groups.

When included, display subsystem 1208 may be used to present a visual representation of data held by non-volatile storage device 1206. The visual representation may take the form of a graphical user interface (GUI). As the herein described methods and processes change the data held by the non-volatile storage device, and thus transform the state of the non-volatile storage device, the state of display subsystem 1208 may likewise be transformed to visually represent changes in the underlying data. Display subsystem 1208 may include one or more display devices utilizing virtually any type of technology. Such display devices may be combined with logic processor 1202, volatile memory 1204, and/or non-volatile storage device 1206 in a shared enclosure, or such display devices may be peripheral display devices.

When included, input subsystem 1210 may comprise or interface with one or more user-input devices such as a keyboard, mouse, touch screen, microphone for speech and/or voice recognition, a camera (e.g., a webcam), or game controller.

When included, communication subsystem 1212 may be configured to communicatively couple various computing devices described herein with each other, and with other devices. Communication subsystem 1212 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some implementations, the communication subsystem may allow computing system 1200 to send and/or receive messages to and/or from other devices via a network such as the Internet.

In an example, a computer-implemented method of determining whether a word or words having a specified spelling were uttered during an audio session that was computer-processed to produce a text transcription comprises receiving a search query of the text transcription, the search query including the word or words having the specified spelling, generating a sequence of search phonemes corresponding to the specified spelling, generating, from the text transcription, a sequence of transcript phonemes corresponding to the text transcription, generating a search alignment in which the sequence of search phonemes is aligned to a transcript phoneme fragment, the transcript phoneme fragment being a subset of the sequence of transcript phonemes, determining that the transcript phoneme fragment and an associated portion of the text transcription resulted from an utterance of the specified spelling based at least on the search alignment having a quality score exceeding a quality score threshold, and outputting a search resulting indicating that the transcript phoneme fragment and the associated portion of the text transcription resulted from the utterance of the specified spelling. In this example and/or other examples, generating the sequence of transcript phonemes corresponding to the text transcription may include tokenizing the text transcription into a sequence of tokens. In this example and/or other examples, generating the sequence of transcript phonemes corresponding to the text transcription may include converting number tokens in the sequence of tokens into word tokens equivalent to the number tokens. In this example and/or other examples, generating the sequence of transcript phonemes corresponding to the text transcription may include removing non-pronounceable tokens from the sequence of tokens. In this example and/or other examples, generating the sequence of transcript phonemes corresponding to the text transcription may include 1) for token in the sequence of tokens, looking-up a pronunciation of the token in a pronunciation dictionary including a plurality of pronunciation entries, each pronunciation entry including one or more phonemes, and 2) for each token in the sequence of tokens that has an existing pronunciation entry in the pronunciation dictionary, add one or more phonemes of the existing pronunciation entry corresponding to the token to the sequence of transcript phonemes. In this example and/or other examples, generating the sequence of transcript phonemes corresponding to the text transcription may include, for each token in the sequence of tokens that does not have an existing pronunciation entry in the pronunciation dictionary, 1) split the token into a plurality of word-piece tokens that each have an existing pronunciation entry in the pronunciation dictionary, and 2) for each word-piece token of the plurality of word-piece tokens, add one or more phonemes of the existing pronunciation entry corresponding to the word-piece token to the sequence of transcript phonemes. In this example and/or other examples, the quality score may be based at least on a Levenshtein distance between the sequence of search phonemes and the transcript phoneme fragment. In this example and/or other examples, generating the search alignment may include 1) aligning the sequence of search phonemes to a candidate transcript phoneme fragments of the sequence of transcript phonemes, 2) generating an alignment score for the candidate transcript phoneme fragment based on an alignment metric, and 3) generating the search alignment in which the sequence of search phonemes is aligned to the candidate transcript phoneme fragment based at least on the alignment score of the candidate phoneme fragment exceeding an alignment threshold. In this example and/or other examples, the alignment metric may include awards for correct matches between search phonemes and phonemes in the candidate transcript phoneme fragment, penalties for mismatches between search phonemes and phonemes in the candidate transcript phoneme fragment, and penalties for opening gaps in an alignment of the sequence of search phonemes and the candidate transcript phoneme fragment. In this example and/or other examples, the specified spelling may be based on user data extracted from a user profile associated with the participant in the audio session. In this example and/or other examples, the computer-implemented method may further comprise replacing the associated portion of the text transcription with the specified spelling in the text transcription based at least on a difference in spelling between the associated portion and the specified spelling to generated a corrected text transcription and outputting the corrected text transcription. In this example and/or other examples, the associated portion of the text transcription may be replaced with the specified spelling in the text transcription further based at least on context data from the audio session.

In another example, a computing system comprises a logic processor, and a storage device holding instructions executable by the logic processor to receive a search query of a text transcription, the search query including a word or words having the specified spelling, generate a sequence of search phonemes corresponding to the specified spelling of the word or words in the search query, generate, from a text transcription computer-generated from an audio session, a sequence of transcript phonemes corresponding to the text transcription, generate a search alignment in which the sequence of search phonemes is aligned to a transcript phoneme fragment, the transcript phoneme fragment being a subset of the sequence of transcript phonemes, determine that the transcript phoneme fragment and an associated portion of the text transcription resulted from an utterance of the specified spelling in the audio session based at least on the search alignment having a quality score exceeding a quality score threshold, and output a search result indicating that the transcript phoneme fragment and the associated portion of the text transcription resulted from the utterance of the specified spelling. In this example and/or other examples, generating the sequence of transcript phonemes corresponding to the text transcription may include tokenizing the text transcription into a sequence of tokens. In this example and/or other examples, generating the sequence of transcript phonemes corresponding to the text transcription may include 1) for each token in the sequence of tokens, looking-up a pronunciation of the token in a pronunciation dictionary including a plurality of pronunciation entries, each pronunciation entry including one or more phonemes, and 2) for each token in the sequence of tokens that has an existing pronunciation entry in the pronunciation dictionary, add one or more phonemes of the existing pronunciation entry corresponding to the token to the sequence of transcript phonemes. In this example and/or other examples, generating the sequence of transcript phonemes corresponding to the text transcription may include, for each token in the sequence of tokens that does not have an existing pronunciation entry in the pronunciation dictionary, 1) split the token into a plurality of word-piece tokens that each have an existing pronunciation entry in the pronunciation dictionary, and 2) for each word-piece token of the plurality of word-piece tokens, add one or more phonemes of the existing pronunciation entry corresponding to the word-piece token to the sequence of transcript phonemes. In this example and/or other examples, the quality score may be based at least on a Levenshtein distance between the sequence of search phonemes and the transcript phoneme fragment. In this example and/or other examples, the storage device may hold instructions executable by the logic processor to replace the associated portion of the text transcription with the specified spelling in the text transcription based at least on a difference in spelling between the associated portion of the text transcription and the specified spelling to generate a corrected text transcription, and output the corrected text transcription. In this example and/or other examples, the associated portion of the text transcription may be replaced with the specified spelling in the text transcription further based at least on a context data from the audio session.

In yet another example, a computer-implemented method of determining whether a word or words having a specified spelling were uttered during an audio session that was computer-processed to produce a text transcription, comprises receiving a search query of the text transcription, the search query including the word or words having the specified spelling, generating a sequence of search phonemes corresponding to the specified spelling, generating, from the text transcription, a sequence of transcript phonemes corresponding to the text transcription, said generating including tokenizing the text transcription into a sequence of tokens, for each token in the sequence of tokens, looking-up a pronunciation of the token in a pronunciation dictionary including a plurality of pronunciation entries, each pronunciation entry including one or more phonemes, for each token in the sequence of tokens that has an existing pronunciation entry in the pronunciation dictionary, add one or more phonemes of the existing pronunciation entry corresponding to the token to the sequence of transcript phonemes, for each token in the sequence of tokens that does not have an existing pronunciation entry in the pronunciation dictionary, split the token into a plurality of word-piece tokens that each have an existing pronunciation entry in the pronunciation dictionary, and for each word-piece token of the plurality of word-piece tokens, add one or more phonemes of the existing pronunciation entry corresponding to the word-piece token to the sequence of transcript phonemes, generating a search alignment in which the sequence of search phonemes is aligned to a transcript phoneme fragment, the transcript phoneme fragment being a subset of the sequence of transcript phonemes, determining that the transcript phoneme fragment and an associated portion of the text transcription resulted from an utterance of the specified spelling based at least on the search alignment having a quality score exceeding a quality score threshold, and outputting a search resulting indicating that the transcript phoneme fragment and the associated portion of the text transcription resulted from the utterance of the specified spelling.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computer-implemented method of determining whether a word or words having a user-specified spelling were uttered during an audio session that was computer-processed to produce a text transcription, comprising:
receiving a search query of the text transcription, the search query including the word or words having the user-specified spelling;
generating a sequence of search phonemes corresponding to the user-specified spelling;
generating, from the text transcription, a sequence of transcript phonemes corresponding to the text transcription;
generating a search alignment in which the sequence of search phonemes is aligned to a transcript phoneme fragment, the transcript phoneme fragment being a subset of the sequence of transcript phonemes;
determining that the transcript phoneme fragment and an associated portion of the text transcription resulted from an utterance of the user-specified spelling based at least on the search alignment having a quality score exceeding a quality score threshold;
outputting a search result indicating that the transcript phoneme fragment and the associated portion of the text transcription resulted from an utterance of the user-specified spelling;
replacing the associated portion of the text transcription with the user-specified spelling in the text transcription based at least on a difference in spelling between the associated portion and the user-specified spelling to generate a corrected text transcription; and
outputting the corrected text transcription.

2. The computer-implemented method of claim 1, wherein generating the sequence of transcript phonemes corresponding to the text transcription includes tokenizing the text transcription into a sequence of tokens.

3. The computer-implemented method of claim 2, wherein generating the sequence of transcript phonemes corresponding to the text transcription includes converting number tokens in the sequence of tokens into word tokens equivalent to the number tokens.

4. The computer-implemented method of claim 2, wherein generating the sequence of transcript phonemes corresponding to the text transcription includes removing non-pronounceable tokens from the sequence of tokens.

5. The computer-implemented method of claim 2, wherein generating the sequence of transcript phonemes corresponding to the text transcription includes 1) for each token in the sequence of tokens, looking-up a pronunciation of the token in a pronunciation dictionary including a plurality of pronunciation entries, each pronunciation entry including one or more phonemes, and 2) for each token in the sequence of tokens that has an existing pronunciation entry in the pronunciation dictionary, add one or more phonemes of the existing pronunciation entry corresponding to the token to the sequence of transcript phonemes.

6. The computer-implemented method of claim 2, wherein generating the sequence of transcript phonemes corresponding to the text transcription includes, for each token in the sequence of tokens that does not have an existing pronunciation entry in the pronunciation dictionary, 1) splitting the token into a plurality of word-piece tokens that each have an existing pronunciation entry in the pronunciation dictionary, and 2) for each word-piece token of the plurality of word-piece tokens, adding one or more phonemes of the existing pronunciation entry corresponding to the word-piece token to the sequence of transcript phonemes.

7. The computer-implemented method of claim 1, wherein the quality score is based at least on a Levenshtein distance between the sequence of search phonemes and the transcript phoneme fragment.

8. The computer-implemented method of claim 1, wherein
generating the search alignment includes 1) aligning the sequence of search phonemes to a candidate transcript phoneme fragment of the sequence of transcript phonemes, 2) generating an alignment score for the candidate transcript phoneme fragment based on an alignment metric, and 3) generating the search alignment in which the sequence of search phonemes is aligned to the candidate transcript phoneme fragment based at least on the alignment score of the candidate phoneme fragment exceeding an alignment threshold.

9. The computer-implemented method of claim 8, wherein the alignment metric includes awards for correct matches between search phonemes and phonemes in the candidate transcript phoneme fragment, penalties for mismatches between search phonemes and phonemes in the candidate transcript phoneme fragment, and penalties for opening gaps in an alignment of the sequence of search phonemes and the candidate transcript phoneme fragment.

10. The computer-implemented method of claim 9, wherein the user-specified spelling is based on user data extracted from a user profile associated with the participant in the audio session.

11. The computer-implemented method of claim 1, wherein the associated portion of the text transcription is replaced with the user-specified spelling in the text transcription further based at least on context data from the audio session.

12. A computing system comprising:
a logic processor; and
a storage device holding instructions executable by the logic processor to:
receive a search query of a text transcription, the search query including a word or words having a user-specified spelling;
generate a sequence of search phonemes corresponding to the user-specified spelling of the word or words in the search query;
generate, from a text transcription computer-generated from an audio session, a sequence of transcript phonemes corresponding to the text transcription;
generate a search alignment in which the sequence of search phonemes is aligned to a transcript phoneme fragment, the transcript phoneme fragment being a subset of the sequence of transcript phonemes;
determine that the transcript phoneme fragment and an associated portion of the text transcription resulted from an utterance of the user-specified spelling in the audio session based at least on the search alignment having a quality score exceeding a quality score threshold;
output a search result indicating that the transcript phoneme fragment and the associated portion of the text transcription resulted from the utterance of the user-specified spelling;
replace the associated portion of the text transcription with the user-specified spelling in the text transcription based at least on a difference in spelling between the associated portion and the user-specified spelling to generate a corrected text transcription; and
output the corrected text transcription.

13. The computing system of claim 12, wherein generating the sequence of transcript phonemes corresponding to the text transcription includes tokenizing the text transcription into a sequence of tokens.

14. The computing system of claim 13, wherein generating the sequence of transcript phonemes corresponding to the text transcription includes 1) for each token in the sequence of tokens, looking-up a pronunciation of the token in a pronunciation dictionary including a plurality of pronunciation entries, each pronunciation entry including one or more phonemes, and 2) for each token in the sequence of tokens that has an existing pronunciation entry in the pronunciation dictionary, add one or more phonemes of the existing pronunciation entry corresponding to the token to the sequence of transcript phonemes.

15. The computing system of claim 13, wherein generating the sequence of transcript phonemes corresponding to the text transcription includes, for each token in the sequence of tokens that does not have an existing pronunciation entry in the pronunciation dictionary, 1) split the token into a plurality of word-piece tokens that each have an existing pronunciation entry in the pronunciation dictionary, and 2) for each word-piece token of the plurality of word-piece tokens, add one or more phonemes of the existing pronunciation entry corresponding to the word-piece token to the sequence of transcript phonemes.

16. The computing system of claim 12, wherein the quality score is based at least on a Levenshtein distance between the sequence of search phonemes and the transcript phoneme fragment.

17. The computing system of claim 12, wherein the associated portion of the text transcription is replaced with the user-specified spelling in the text transcription further based at least on context data from the audio session.

18. A computer-implemented method of determining whether a word or words having a user-specified spelling were uttered during an audio session that was computer-processed to produce a text transcription, comprising:
receiving a search query of the text transcription, the search query including the word or words having the user-specified spelling;
generating a sequence of search phonemes corresponding to the user-specified spelling;
generating, from the text transcription, a sequence of transcript phonemes corresponding to the text transcription, said generating including:
tokenizing the text transcription into a sequence of tokens,
for each token in the sequence of tokens, looking-up a pronunciation of the token in a pronunciation dictionary including a plurality of pronunciation entries, each pronunciation entry including one or more phonemes, for each token in the sequence of tokens that has an existing pronunciation entry in the pronunciation dictionary, add one or more phonemes of the existing pronunciation entry corresponding to the token to the sequence of transcript phonemes, for each token in the sequence of tokens that does not have an existing pronunciation entry in the pronunciation dictionary, split the token into a plurality of word-piece tokens that each have an existing pronunciation entry in the pronunciation dictionary, and for each word-piece token of the plurality of word-piece tokens, add one or more phonemes of the existing pronunciation entry corresponding to the word-piece token to the sequence of transcript phonemes;

generating a search alignment in which the sequence of search phonemes is aligned to a transcript phoneme fragment, the transcript phoneme fragment being a subset of the sequence of transcript phonemes;

determining that the transcript phoneme fragment and an associated portion of the text transcription resulted from an utterance of the user-specified spelling based at least on the search alignment having a quality score exceeding a quality score threshold;

outputting a search result indicating that the transcript phoneme fragment and the associated portion of the text transcription resulted from the utterance of the user-specified spelling;

replacing the associated portion of the text transcription with the user specified spelling in the text transcription based at least on a difference in spelling between the associated portion and the user-specified spelling to generate a corrected text transcription; and outputting the corrected text transcription.

\* \* \* \* \*